United States Patent [19]

Holmes

[11] Patent Number: 4,606,036

[45] Date of Patent: Aug. 12, 1986

[54] DECENTERED ANNULAR RING RESONATOR WITH INTERNAL MISALIGNMENT CANCELLATION

[75] Inventor: Dale A. Holmes, Simi Valley, Calif.

[73] Assignee: Rockwell International Corporation, El Segundo, Calif.

[21] Appl. No.: 527,593

[22] Filed: Aug. 29, 1983

[51] Int. Cl.⁴ .............................................. H01S 3/08
[52] U.S. Cl. ....................................... 372/95; 372/93; 372/99; 372/103; 372/108
[58] Field of Search ...................... 372/95, 99, 93, 103, 372/108, 92, 94

[56] References Cited

U.S. PATENT DOCUMENTS 4,050,036 9/1977 Chambers et al. ..................... 372/95
4,514,850 4/1985 Holmes et al. ......................... 372/95

Primary Examiner—James W. Davie
Attorney, Agent, or Firm—H. Fredrick Hamann; Harry B. Field; Lawrence N. Ginsberg

[57] ABSTRACT

An improvement for a decentered annular ring resonator (DARR) 10 for a laser whereby misalignment sensitivity to odd-periodicity azimuthal phase errors is reduced. A front and a rear waxicon reflector 18 and 20 are employed, the front waxicon 18 having four reflecting surfaces 60,62,64 and 66 and the rear two 70 and 72. The laser beam is cycled between the waxicons twice, the front waxicon 18 separating the paths of the first and second cycle beams. The rear waxicon 20 provides a 180° azimuthal shift in the orientation of an incoming beam 36 so that the beam traversing the second cycle 48,50, 52 is shifted 180° in azimuth relative to the beam of the first cycle 40, 42,44. Odd-periodicity azimuthal phase errors are automatically cancelled by this 180° azimuthal change in orientation of the second-cycle beam 46 before it starts on the second traversal of the internal path of the DARR.

10 Claims, 2 Drawing Figures

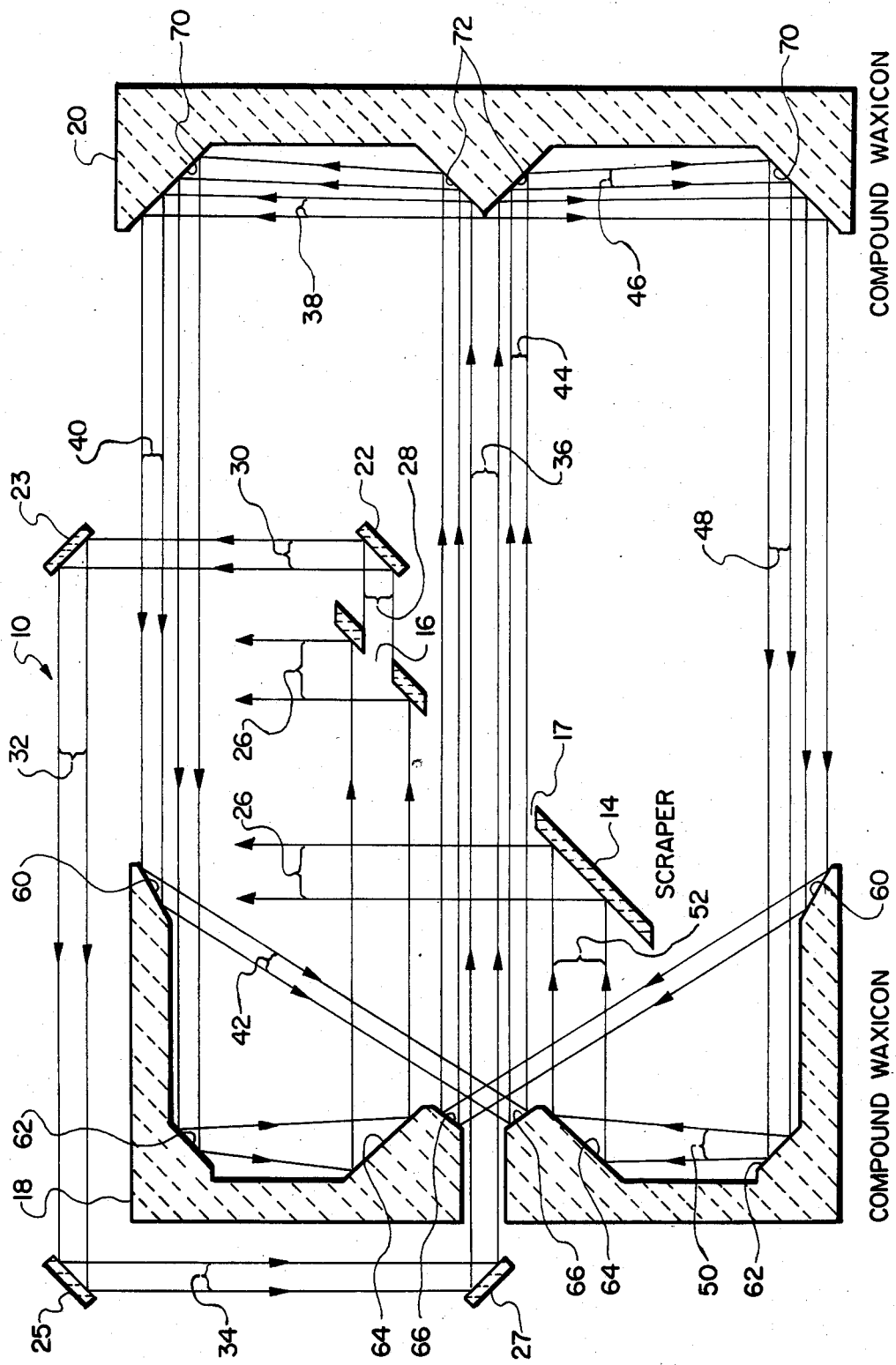

DECENTERED ANNULAR RING RESONATOR WITH INTERNAL MISALIGNMENT CANCELLATION

BACKGROUND OF THE INVENTION

1. Field of the Invention

This invention relates to ring resonators for lasers and especially to a decentered annular ring resonator using two waxicon beam reflectors.

2. Description of the Prior Art

The Decentered Annular Ring Resonator (DARR) has often been considered as a candidate resonator for extracting power from an annular gain region of an associated laser. A typical DARR configuration is shown in FIG. 1. The DARR consists basically of two waxicons 18,20, one at each end of annular gain region, a scraper/feedback mirror train 14,22,24 in the compact leg of the resonator to provide the out-coupled beam 26 and the feedback beam 28. The power is extracted fom the annular gain region 12 by the collimated annular beam. The terminology "decentered" arises from the fact that the feedback beam is created by a decentered hole 16 in the scraper mirror.

The Achilles heel of the DARR is its sensitivity to small misalignments of the waxicon assemblies. A tilt of either waxicon introduces a $\cos\phi$ (where $\phi$ is the azimuthal angular coordinate) phase error in the outcoupled beam. Such phase errors degrade the focusability of the output beam, i.e., the peak far-field irradiance is seriously degraded by near-field phase errors of the form $\cos\phi$. The sensitivity of the DARR to waxicon tilt misalignment is so great that the DARR is impractical for many applications.

SUMMARY OF THE INVENTION

The invention comprises a waxicon configuration for a DARR which propagates the feedback laser beam in a double cycle around the resonator with 180° rotation between cycles. Two reflecting structures are employed. During the second cycle, the beam is effectively rotated 180° (azimuthally) relative to its orientation in the first cycle, whereby odd-periodicity, azimuthal phase errors accumulated during the first cycle are accumulated with opposite sign during the second cycle and are therefore automatically cancelled in one complete round trip (i.e., two cycles from input feedback beam to output beam).

OBJECTS OF THE INVENTION

An object of the present invention is to reduce the sensitivity of the DARR to small misalignments of the waxicon assemblies.

Another object is to provide for automatic, internal cancellation of phase errors in the reflected laser beams resulting from waxicon tilts.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic illustration of a preferred embodiment of the invention.

DETAILED DESCRIPTION OF THE PREFERRED EMBODIMENT

Figure 1:
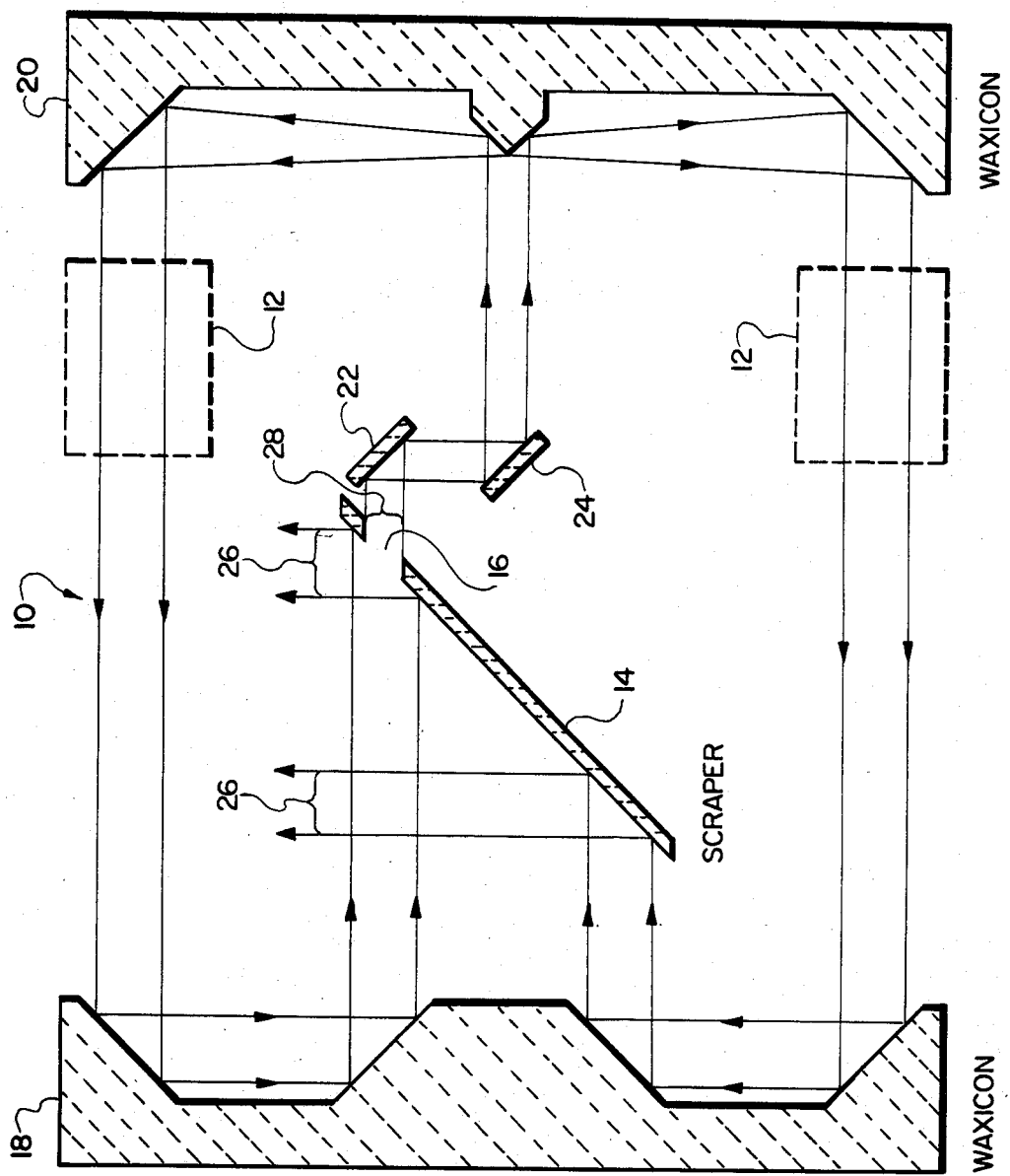
FIG. 1 is a schematic illustration of a typical DARR.

Referring now to the embodiment of FIG. 2, a small portion 28 of the output beam 26 is fed back through a decentered hole 16 in a scraper mirror 14. The feedback beam 28, 30, 32, 34, 36 is fed back through a central hole in the first compound waxicon reflector 18 by means of a train of feedback mirrors 22, 23, 25, 27. The last portion 36 of the feedback beam is directed upon the mirror 72 of the center axicon of the rear waxicon 20 which reflects the beam radially outward to the ring mirror 70 of the outer axicon of the rear waxicon 20, which directs the beam 40 through the annular gain region (not shown) of the laser to the front waxicon 18. The double reflection of the beam by the rear waxicon 20 rotates the orientation of the beam by 180° azimuthally.

The beam 40 is now reflected twice by the annular mirror surfaces 60 and 66 of the front waxicon 18 and returned as beam 44 to the rear waxicon 20. Here the beam is again reflected twice by inner and outer mirrors 72 and 70, respectively, to rotate the orientation of the outgoing beam 48 by 180° relative to the orientation of the incoming beam 44. The outgoing beam 48 goes through the annular gain region (not shown) and is directed upon the front waxicon 18. Again, there are two reflections (by mirror surfaces 62 and 64 of the front waxicon 18) and the reflected beam 52 impinges on the scraper mirror 14 whence it is couples out of the laser as output beam 26.

It should be noted that, although they are preferred since they are unitary structures which can be kept in better alignment and are simpler to fabricate than individual mirrors, waxicons do not have to be used for the front and rear mirror assemblies. Individual mirrors can be assembled to provide the same reflections as are provided by the waxicon reflector structures shown in FIG. 2. For example, the rear waxicon could be a reflaxicon mirror comprising central conical mirror and an outer annular conical mirror. The details of the individual waxicon surfaces can be implemented in a variety of ways, all within the scope of this invention. Similarly, the details of the scraper/feedback mirror train can be implemented in a variety of ways to suit specific applications.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a DARR in a laser, the improvement comprising:
    means for reflecting the feedback beam on a first cycle around the DARR; and
    means for reflecting the once-cycled beam in a second cycle around the DARR and for changing the azimuthal orientation of the once-cycled beam by 180° substantially at the start of the second cycle.
2. The improvement defined in claim 1, wherein:
    said first cycling means comprises a compound waxicon reflector.
3. The improvement defined in claim 1, wherein:
    said first cycling means comprises a waxicon reflector having four reflecting surfaces.
4. The improvement defined in claim 1, wherein:

said first cycling means comprises a waxicon reflector having four annular reflecting surfaces.

5. The improvement defined in claim 1, wherein:
said second cycling means comprises a reflecting structure providing a double reflection for each incoming beam whereby the azimuthal orientation of an incoming beam is changed by 180°.

6. The improvement defined in claim 1, wherein:
said second cycling means comprises a waxicon reflector providing a double reflection for each incoming beam whereby the azimuthal orientation of the incoming beam is changed by 180°.

7. The improvement defined in claim 1, wherein:
said first and second cycling means comprise a front and a rear compound waxicon, respectively.

8. The improvement defined in claim 7, wherein:
said front waxicon has four annular reflecting surfaces and said rear waxicon has two annular reflecting surfaces, an incoming beam to the rear waxicon having its azimuthal orientation changed by 180°.

9. The improvement defined in claim 8, wherein:
the four reflecting surfaces of the front waxicon separate the paths of the beams in the first cycle from the beams in the second cycle.

10. The improvement defined in claim 9, wherein:
the front waxicon is formed with a central aperture through which is directed the feedback beam at the start of the first cycle.

* * * * *